United States Patent [19]

Bell, Jr.

[11] Patent Number: 5,400,306
[45] Date of Patent: Mar. 21, 1995

[54] DIFFERENTIAL DETECTION ASSEMBLY FOR DATA RETRIEVAL FROM A DATA STORAGE DISK

[75] Inventor: Bernard W. Bell, Jr., Colorado Springs, Colo.

[73] Assignee: Hewlett-Packard Company, Palo Alto, Calif.

[21] Appl. No.: 71,169

[22] Filed: Jun. 2, 1993

[51] Int. Cl.6 .................................... G11B 11/00
[52] U.S. Cl. ........................ 369/13; 369/44.23; 369/110; 369/112; 360/114
[58] Field of Search ............ 369/13, 14, 44.23, 44.24, 369/44.12, 110, 112, 54, 58, 114, 44.37, 44.38, 44.39, 44.11, 116; 360/114, 59; 365/122

[56] References Cited

U.S. PATENT DOCUMENTS

| | | | |
|---|---|---|---|
| 4,569,035 | 2/1986 | Tomita | 365/122 |
| 4,573,149 | 2/1986 | Deguchi et al. | 369/13 |
| 4,725,145 | 2/1988 | Azzam | 356/367 |
| 4,803,579 | 2/1989 | Koyama | 360/114 |
| 4,823,331 | 4/1989 | Yoshitoshi et al. | 369/112 X |
| 5,095,476 | 3/1992 | Greve et al. | 369/110 |

OTHER PUBLICATIONS

Mansuripur M., et al., "Signal and Noise in Magneto-Optical Readout," J. Appl. Phys. 53(6) (Jun. 1982), pp. 4485–4494.

Freese, Robert P., "Optical Disks Become Eraseable," IEEE Spectrum, Feb. 1988 pp. 41–45.

*Primary Examiner*—Ali Neyzari
*Attorney, Agent, or Firm*—Cynthia S. Baan

[57] ABSTRACT

An optical assembly for detecting a light beam returning from an optical storage media and generating a signal representative of the information stored on the storage media wherein the optical assembly includes a first photodetector that is positioned in the path of the returning light beam at a predetermined angle, so that p polarized light contained in the light beam will be absorbed by the first photodetector and s polarized light will be reflected and redirected toward a second photodetector, which is positioned in the path of the redirected s polarized light and perpendicular to the path of the s polarized light, such that substantially all of the s polarized light is absorbed by the second photodetector and the photocurrents produced by the two photodetectors are differenced to produce a signal representative of the information stored on the storage disk.

19 Claims, 7 Drawing Sheets

DIFFERENTIAL DETECTION ASSEMBLY FOR DATA RETRIEVAL FROM A DATA STORAGE DISK

FIELD OF THE INVENTION

The present invention pertains generally to the field of optical and magneto-optical information systems and, more specifically to a method and apparatus for retrieving information from a beam of light reflected by a storage disk media. In particular, the present invention pertains to portions of an optical assembly for detecting the polarization of light reflected by a storage disk media in order to retrieve information stored on the disk, where the polarization of the light reveals the information stored.

BACKGROUND OF THE INVENTION

Information storage and retrieval systems, particularly those used in computer systems, typically record data magnetically, optically or magneto-optically onto several types of storage media, rotating magnetic or optic tape or disks for example. Such storage media may be utilized for document files, computer output memories, compact disk players, hard disk drives and the like. Depending on the type of storage media and recordation system, information may be recorded only once and then retrieved many times or it may be recorded, retrieved, erased and re-recorded indefinitely. Generally, the media of optical storage systems can only be written once and read many times, such as compact disks.

The limiting feature of tape recording systems is that the media deteriorates with use and time. Although the degeneration does not occur as quickly, magnetic disk media also wear and have a limited life span. And while there are removable magnetic recording systems, typically, these systems are not suited for removability and long term reliability is a constant problem with such systems, due to the media's susceptibility to data corruption and erasure by outside stimuli, such as stray electro-magnetic fields. On the other hand, magneto-optical storage has the advantage of indefinite recording and erasure cycles without media deterioration problems and the media has the added advantage of removability and transportability between drives, as the media with its built in dust protection and non-contact operation is remarkably stable against normal outside influences.

Data stored on disks, whether magnetic, optical or magneto-optical, is contained within thousands of spiral or concentric tracks about the disk center. The total number of tracks and thus the storage capacity of the disk depends on the diameter of the disk utilized and the method of recordation of the disk. The amount of information that can be stored per unit area on the optical or magneto-optical media surface is much greater than the amount that can be stored on magnetic media, because the precision of an optical stylus is about 1 $\mu$m, allowing the tracks to be spaced closely together. However, the track spacing of magnetic disks is limited to greater than 15 $\mu$m, due to track runout and the signal to noise considerations of electromagnetic fields. Accordingly, the recording density of an optical or magneto-optical disk is between 10 and 100 times greater than that of a magnetic disk.

Figure 1:
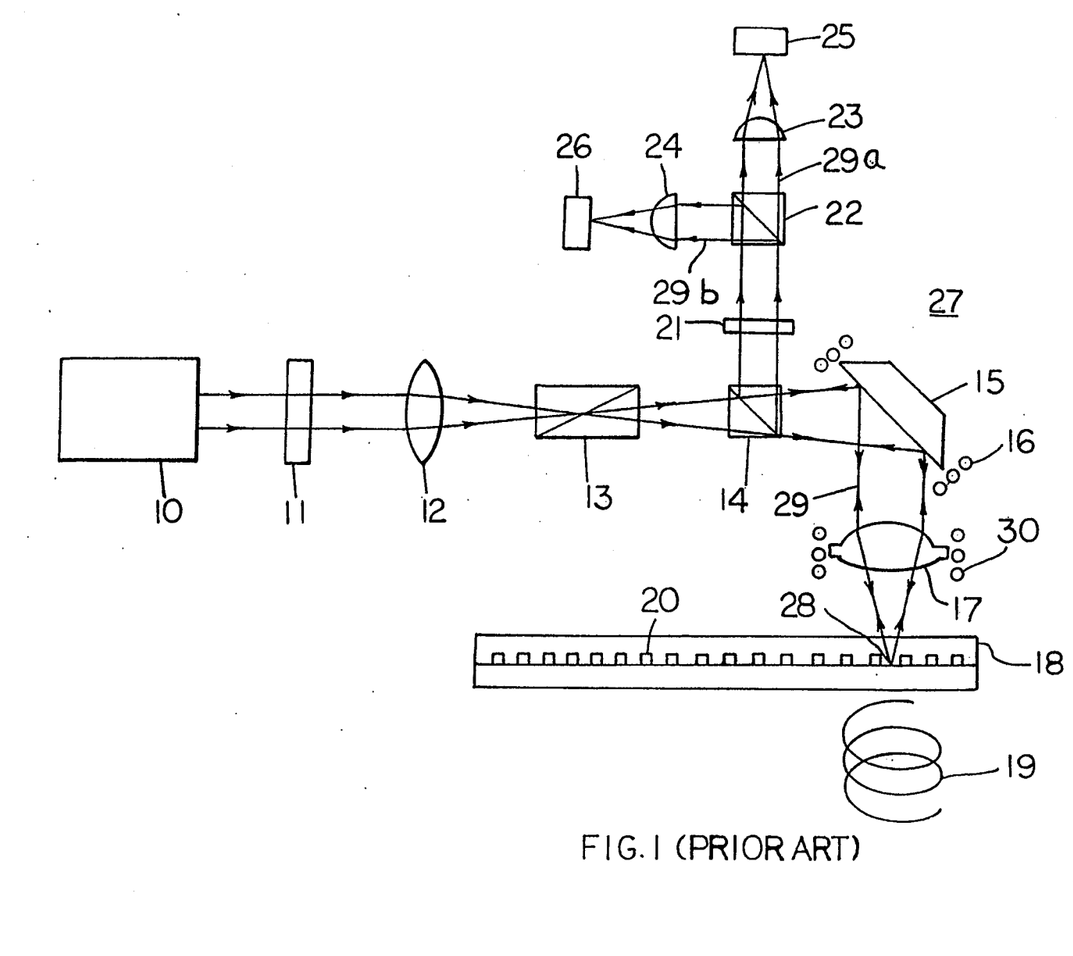
FIG. 1 shows a schematic diagram illustrating the arrangement of a conventional magneto-optical storage system.

In both magnetic recording and magneto-optical recording, information is stored on a storage disk by orienting the magnetic field of the media at given points or bits along a given track. In order to record, access and read data on a disk, a transducer head in the case of magnetic recording or an optical head as shown in FIG. 1 in the case of magneto-optical recording is moved along a generally radial path across the surface of the storage disk as the storage disk is rotated. The generally radial movement of the transducer head in the case of magnetic recording or the optical head in the case of magneto-optical recording will either follow a straight line path or an arcuate path, depending upon whether a linear or rotary actuator is utilized to position the head.

The principles of magneto-optical storage are well known. Information is recorded on and erased from a thin film of magnetic material which is deposited on a substrate of suitable material. Information is encoded and stored in a sequence of magnetic bits oriented normal to the storage media surface in either of two possible orientations, north pole up or north pole down for example. To erase a track, all of its magnetized bits are oriented in one direction. Typically, for magneto-optical media, the magnetic or coercive force required to reverse a magnetic bit from, say, north pole up to north pole down, varies greatly with the temperature of the media. At room temperature, magneto-optical material is relatively resistant to changes in magnetization. The measure of this resistance is called coercivity. The coercivity of the material used in magneto-optical recording can be readily altered at a high temperature, called the Curie point. At the Curie point, about 150° C., the coercive force necessary to reverse the magnetization decreases substantially and the magnetization may be reversed by a relatively small magnet or an electromagnetic device.

Typically, magneto-optical storage devices comprise an optical head including lasers, collimating lenses, beam shaping prisms, beamsplitters, plane mirrors, an objective lens, a focus positioner, a tracking positioner, collecting lenses and detectors, as noted in prior art FIG. 1. These components are, as would be expected, complex, expensive and increase the mass and size of the optical head. Referring now to prior art FIG. 1, a conventional magneto-optical head assembly 27 and its operation will now be described. During a recording operation, a laser diode 10 provides the heat source necessary for a storage media 20 to reach its Curie point. A 4 or 5 mm laser beam 29 provided by laser diode 10 passes through a grating 11, a lens 12, a polarizer 13 and a beamsplitter 14 to a movable reflecting mirror 15 and is focused at a point 28 (which represents 1 bit of information) on the magnetic material 20 of a storage disk 18 by a movable objective lens 17.

In this manner, bit 28 on the storage disk 18 can be heated, thereby lowering the coercive force required to change the magnetization of the bit. A magnetic field generated by coil 19 will cause the orientation of the magnetic domain of bit 28 being heated by the laser beam 27 to be reversed. When the laser beam is turned off, heated bit 28 is cooled in the magnetic field, thereby freezing the bit in the desired orientation. The magnetic field generated in the coil 19 by a current is in one direction for writing and in the opposite direction for erasing.

Information is read from the magneto-optical storage disk using a laser beam of reduced intensity. Thus, the magnetic film's temperature increase and corresponding coercivity decrease are small enough that the direction of magnetization is not changed. Because of the magneto-optic phenomenon known as the Kerr effect, when a linearly polarized laser beam is reflected from the vertically magnetized film 20, the plane of polarization of the laser beam will be rotated as a function of the magnetic orientation of the bit. The polarization of laser beam portions reflected from bit positions on the disk is detected by opto-electronic detector circuitry, such as photodetectors. Signals from the detecting circuitry are then processed to determine whether the bit position is representative of a digital one or zero.

For data retrieval, the laser beam emitted from the laser diode or other suitable light source 10 is first linearly polarized by the polarizer 13. Then it passes through a beamsplitter 14 and is reflected by the mirror 15 through a lens 17 onto the disk 18. The laser beam 29 is then reflected by the magnetic film 20 of the storage disk 18. The beam 29 reflected from the film 20 of the disk 18 will have its plane of polarization rotated about 0.25° to 0.5° depending of the magnetic orientation of the bit due to the polar Kerr effect. Typically, magneto-optical storage films have Kerr rotation angles of less than 1°. The reflected beam 29 then passes through the lens 17 and is reflected by the mirror 15 to the beamsplitter 14 where some of the beam is passed through the waveplate 21 to the polarizing beamsplitter 22, which splits the laser beam 29 into two orthogonal polarization states p=29a and s=29b, for example. Beams 29a and 29b then pass through cylindrical collecting lenses 23 and 24 and are detected by photodetectors 25 and 26, respectively. Photodetectors 25 and 26 transform the light irradiance from beams 29a and 29b into photoelectric signals $i_p$ and $i_s$, which are then subtracted to yield a signal representative of the bit of information being read. The detected signal is then processed to extract the information contained therein. This differential type of detection is superior to other methods of signal detection as it provides some common mode noise reflection and has an improved signal to noise ratio.

Due to the many optical elements, the typical optical head measures several centimeters on a side, is 10 to 15 millimeters high, and weighs about 100 grams. Owing to its size and weight, the standard optical disk assembly is inferior to magnetic disk assemblies in its track-seek time, it's use in multi-head, multi-surface, multi-disk drives, and its use in size critical applications such as lap-top computers and notebook computers. Furthermore, optical and magneto-optical assemblies also entail a complex assembly and adjustment process, as the reduced track spacing and resulting bit densities require greater precision than magnetic storage systems. Due to the number of expensive components and corresponding complicated assembly, the average optical or magneto-optical storage assembly is much more costly than the average magnetic storage assembly.

Accordingly, there is need in the field of information storage systems for optical and magneto-optical assemblies, that have the customary advantages of stable media and large areal density, but that are also compact in size, light weight, less complex, and more economical. There is further need in the field for an improved optical storage assembly having multi-surface, multi-disk capabilities. The present invention meets these and other needs.

SUMMARY OF THE INVENTION

It is an object of the present invention to eliminate the aforementioned disadvantages of the prior art and to provide an optical disk drive apparatus having fewer elements, lower cost and lighter weight than the prior art.

In accordance with the principles of the present invention, an optical assembly which detects a beam of light reflected from the surface of a storage disk and produces a signal that represents the information stored on the storage disk is provided. The optical assembly of the present invention eliminates the typical polarizing beamsplitter and one or both of the collecting lenses used in most optical signal detection assemblies. The present invention performs the differential detection technique commonly used in optical and magneto-optical systems with just two photodetectors and an optional collecting lens.

The present invention has considerable advantages over known differential detection methods and assemblies for retrieving information stored on a disk. Specifically, it is compact and light weight, and thus capable of use in size critical applications, such as laptop computers, notebook computers, etc. Also, the present invention is relatively inexpensive compared to prior art assemblies that have numerous optical elements for data detection.

BRIEF DESCRIPTION OF THE DRAWINGS

The above and other objects, features and advantages of the invention will be better understood by reading the following more particular description of certain preferred embodiments of the invention, presented in conjunction with the following drawings, wherein.

DETAILED DESCRIPTION OF THE PRESENT INVENTION

Figure 2:
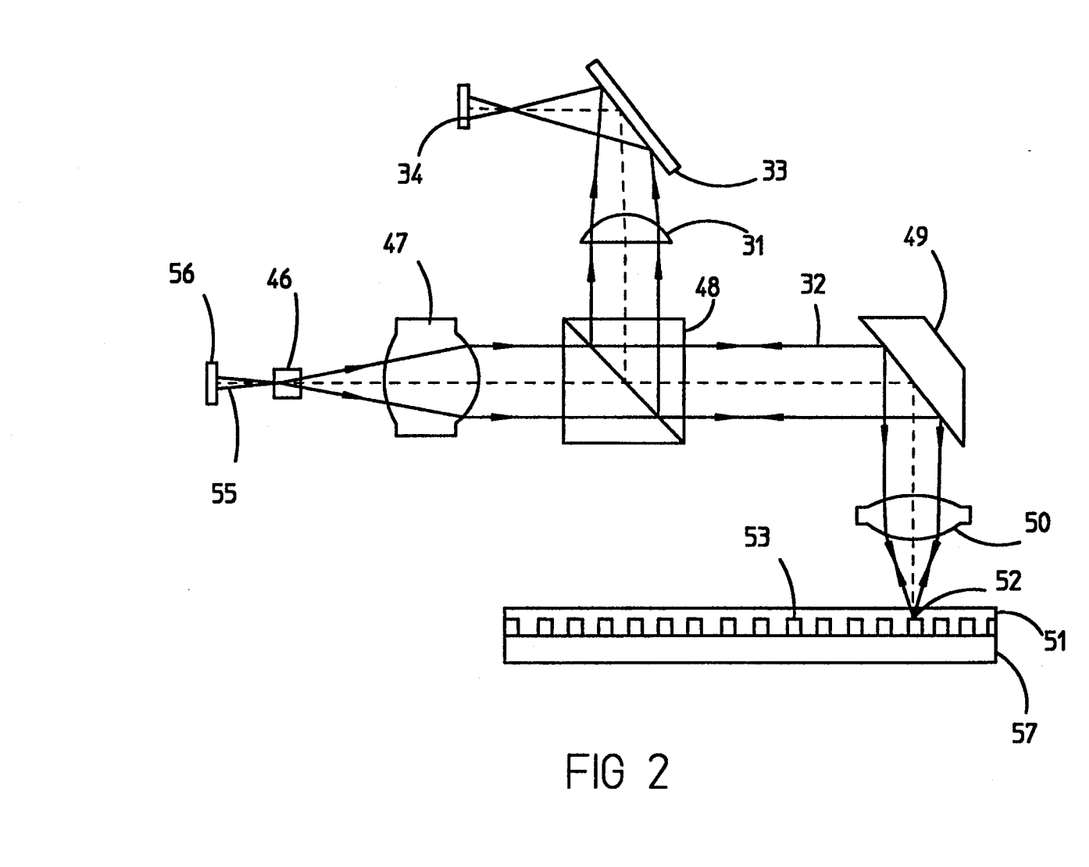
FIG. 2 shows a schematic diagram illustrating an arrangement of the optical assembly of a magneto-optical storage and retrieval system according to the present invention.

FIG. 2 shows a schematic diagram illustrating an arrangement of the optical assembly of a magneto-optical storage and retrieval system according to the present invention. The optical arrangement of FIG. 2 includes a laser beam source 46, a collimating lens 47, a beamsplitter 48, a mirror 49, an objective lens 50, a collecting lens 31, a first photodetector 33, a second photodetector 34, and a third photodetector 56. Lens 31 can be made of molded glass or a plastic of optical quality such as polycarbonate or acrylic and acts as a collecting lens. Photodetectors 33 and 34 are, for example, silicon photodetectors, but can be any photodetector capable of transforming light irradiance into an electrical signal.

During data recordation, a laser beam source 46 provides a laser beam 32, which passes through collimating lens 47 and beamsplitter 48, and is reflected by mirror 49 toward objective lens 50. Objective lens 50 focuses the beam at a point 52 on a magnetic recording layer 53 of a magneto-optical storage disk 57. Substrate 51 of storage disk 57 is a glass or plastic material of low birefringence, which permits the beam 32 to pass through to the recording layer 53 without notable optical interference.

For data retrieval, laser beam 32 is reflected by the storage disk 57 back through the focusing objective lens 50 and bent by mirror 49 toward beamsplitter 48. The reflected beam's plane of polarization is rotated according to whether the bit being read is a "1" or a "0".

When the returning beam reaches the beamsplitter 48, part of the beam passes through and part is reflected. The part of the returning beam passing through beamsplitter 48 is collected by lens 47 and returned to light source 46. The photodetector 56, mounted behind the light source 46, detects the rear-facet emission 55 of the light source 46. The photocurrent generated by photodetector 56 is used to monitor the light source output power, as the rear-facet emission is proportional to the front-facet emission of a light source. Control circuitry (not shown) then adjusts the power of the light source 46, depending on whether the operation in progress is a read or a write operation.

The part of the returning beam that is reflected by beamsplitter 48 is collected by collecting lens 31 and then impinges a first photodetector 33 at a predetermined angle of incidence such that light of p polarization contained in the beam is substantially absorbed by photodetector 33 and light of s polarization contained in the beam is substantially reflected by the surface of photodetector 33 and redirected toward a second photodetector 34. The light reflected from the first photodetector 33 impinges the second photodetector 34 substantially perpendicular to the surface of the second photodetector such that the incoming s polarized light is predominately absorbed by the second photodetector.

Figure 3:
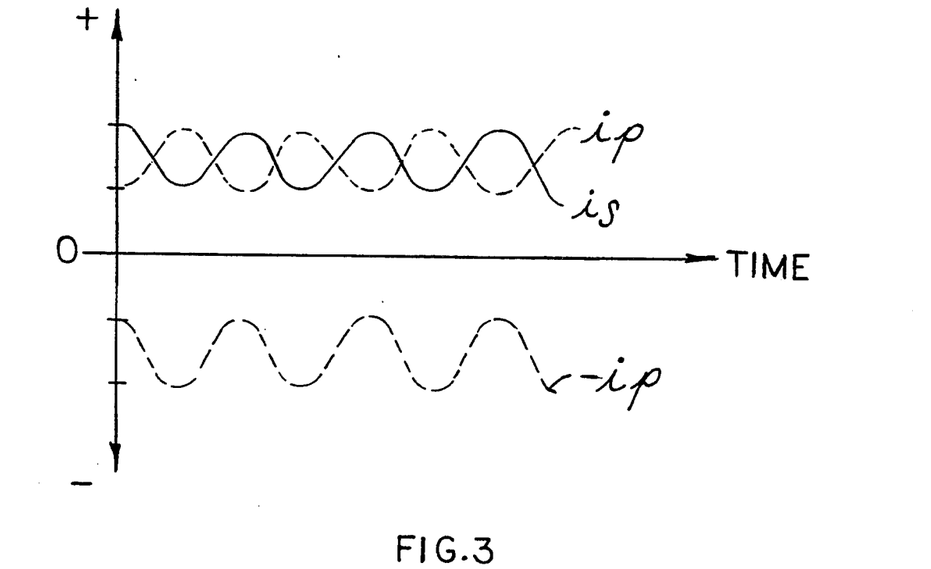
FIG. 3 shows a graph representing the magnitude of the detected signal $i_p$ of the p polarization state, the detected signal $i_s$ of the s polarization state, and the $-i_p$ signal as a function of time.
Figure 4:
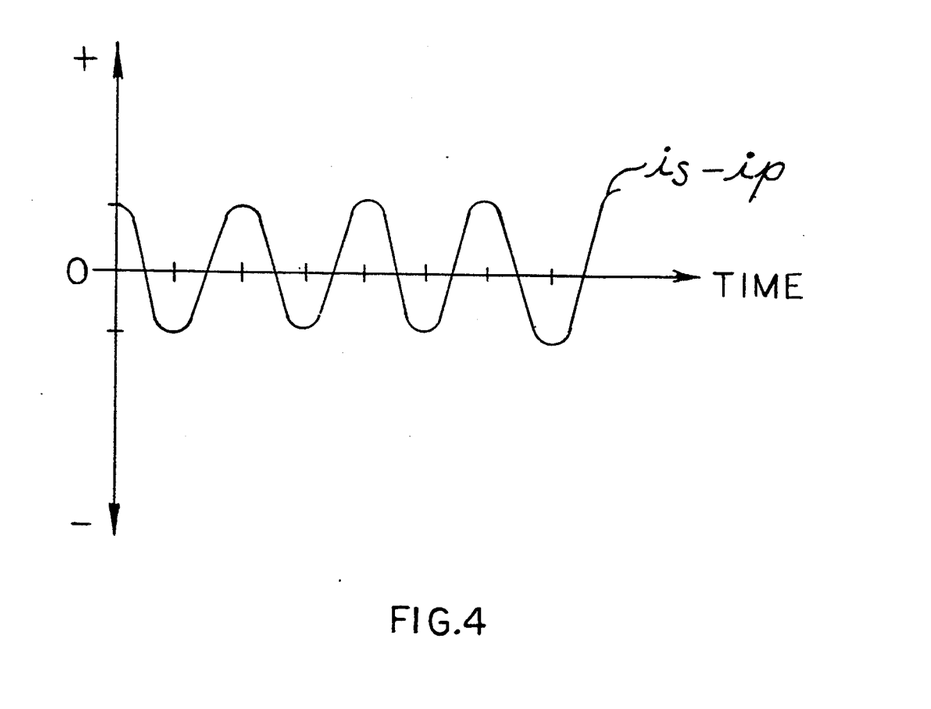
FIG. 4 shows a graph representing the magnitude of the resulting signal obtained by differencing signals, $i_s$ and $i_p$, as a function of time.

Photodetectors 33 and 34 convert the incident light into photocurrents $i_p$ and $i_s$, respectively. Photocurrents $i_p$ and $i_s$ are proportional to the incident light on each corresponding photodetector. Signals $i_p$ and $i_s$ are represented graphically by FIG. 3 along with the waveform for $-i_p$. Associated circuitry (not shown) differences the two photocurrents produced by the two photodetectors 33 and 34 using the equation $i_s - i_p$, thus forming a signal twice as large as the signal obtained from a single detector as illustrated graphically in FIG. 4. In this manner, a differential magneto-optical signal of optimal signal-to-noise ratio is generated.

Figure 5:
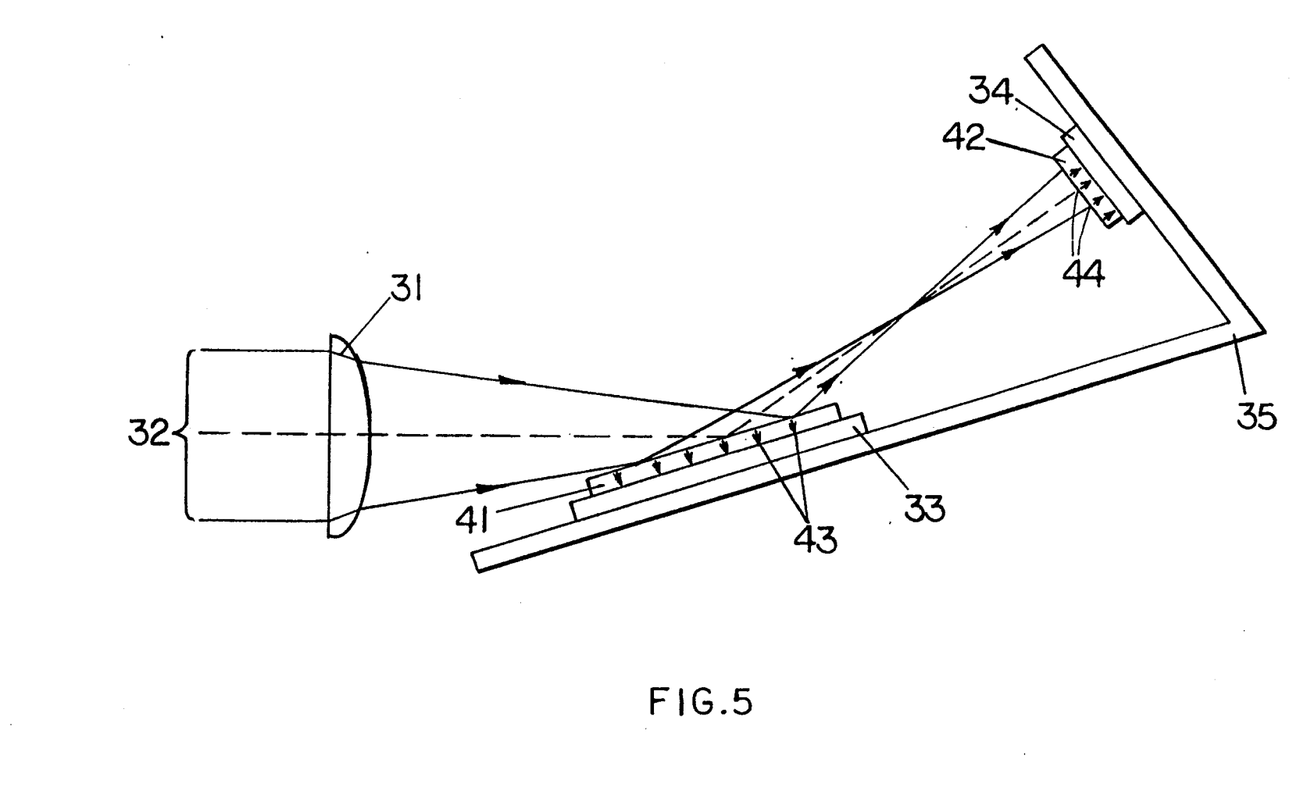
FIG. 5 shows a side cut-away view of the two photodetectors and the collecting lens of the differential detection assembly of the present invention.
Figure 6:
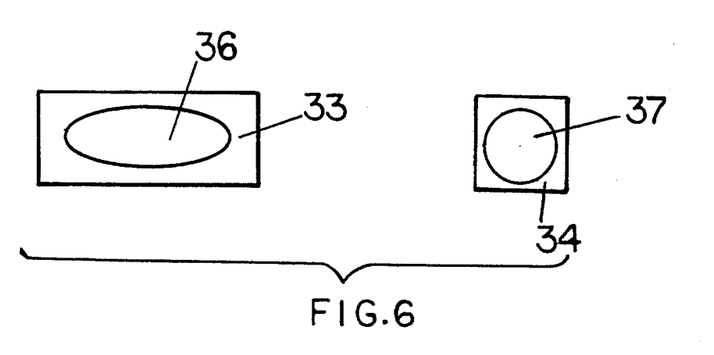
FIG. 6 shows a top planar view of the two photodetectors of the differential detection assembly of the present invention.

FIG. 5 shows first photodetector 33 with a transparent overcoat 41 which it has been discovered enhances the absorption of p polarized light 43 and reflects s polarized light. A second photodetector 34 is fixedly positioned a predetermined distance and angle from the first photodetector 33 by means of support member 35. Photodetector 34 is positioned by support member 35 in such a manner that incoming s polarized light is substantially perpendicular to the surface of photodetector 34. An optional transparent, anti-reflection overcoat 42 may be added to the second photodetector 34 to minimize reflectances and enhance the absorption of s polarized light. FIG. 6 is a top planar view of the two photodetectors 33 and 34 and the resulting light 36 and 37, which is incident on either photodetector.

Figure 7:
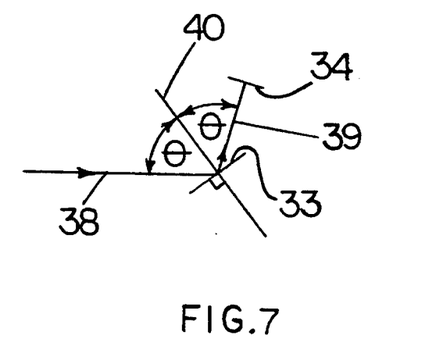
FIG. 7 shows a side view of the relative angles of the light beam and the two photodetectors of the differential detection assembly of the present invention.
Figure 8:
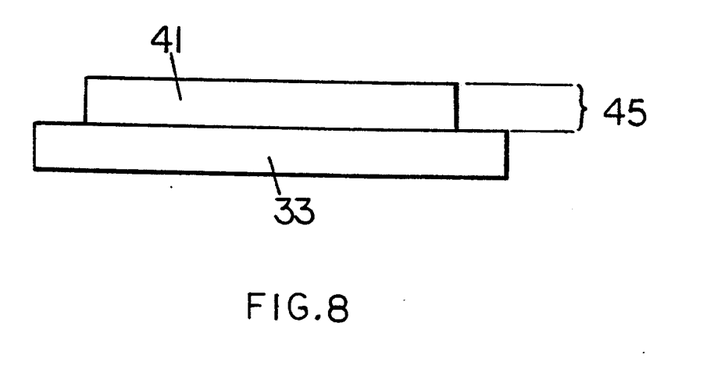
FIG. 8 shows a side view of one of the photodetectors of the present invention and its corresponding protective overcoat.

Referring now to FIGS. 7 and 8, the characteristics of photodetectors 33 and 34 that optimize the absorption of the p polarized light and the reflection of s polarized light by photodetector 33 and the absorption of s polarized light by photodetector 34 will now be described. In order to maximize the absorption of the p polarized light 43 by photodetector 33 and the reflection of s polarized light, a protective overcoat 41 is applied to photodetector 33. Overcoat 41 can be any transparent, dielectric material with a refractive index of approximately 1.1 to 3.0 such that the s polarized light is reflected and the p polarized light is absorbed, for example, silica, aluminum oxide or silicon nitride.

In optimizing the absorption of p polarized light and the corresponding reflectance of s polarized light at photodetector 33, the angle theta between the incident light path 38 and the normal axis 40 of photodetector 33 is important as well as the thickness 45 of the overcoat 41. For the absorption of p light and the reflection of s light to be maximized at photodetector 33, the angle theta must be greater than or less than 0°. Moreover, it has been discovered that the absorption of p light and the reflection of s light at photodetector 33 are maximized when theta is 70°.

With regards to the second photodetector 34, it is desirable to maximize the absorption of the s polarized light 44, which has been reflected from the first photodetector 33. To this end, the second photodetector 34 should be positioned perpendicular to the general path of the light reflected by the first photodetector 33 (i.e., the angle of incidence of incoming light on photodetector 34 should be 0°. Although photodetector 34 does not need an overcoat, to ensure maximum absorption of s polarized light, it is beneficial to coat the second photodetector 34 with any known transparent, anti-reflective material.

In a preferred embodiment, photodetectors 33 and 34 are silicon photodetectors. Photodetector 33 has a silica overcoat 41 of 1,890 Angstroms and is at an angle of incidence (theta) of 70°. Photodetector 34 has no overcoat and is positioned perpendicular to the path of the incoming s polarized light. As will be seen from Table I, at a wavelength of lambda of 8,310 Angstroms, an angle theta of 70°, and an overcoat thickness of 1,890 Angstroms, the ability of detector 33 to convert p light is maximized. Referring now to Table I, the relative amplitude attenuation ratio $(r_p/r_s)$ was determined at various overcoat layer thicknesses. The value of psi, the intensity attenuation ratio, that is, was then calculated according to the following formula:

$$\tan(\mathrm{psi}) = r_p/r_s \qquad (1)$$

This equation can be rearranged to yield:

$$\mathrm{psi} = \tan^{-1}(r_p/r_s) \qquad (2)$$

Given psi, the ratio of the reflectivity of light that is p polarized to the reflectivity of light that is s polarized can be calculated by the following formula:

$$\tan^2(\text{psi}) = R_p/R_s \quad (3)$$

Where the reflectance of p polarized light is $R_p = r_p \bar{r}_p$ and the reflectance of s polarized light is $R_s = r_s \bar{r}_s$. Thus, as will be seen from Table I, psi reaches a peak value at 88.702°, which corresponds to a ratio, $r_p/r_s$ of 280.639. Using psi=88.702°, the maximum reflectivity ratio, $R_p/R_s$, is calculated to be 820. It should be noted that at this angle, other thicknesses for overcoat 41 will also work, especially $2\pi$ multiples of this thickness. As will be readily apparent to one of skill in the art, the ratio $R_p/R_s$ can be tuned or maximized by changing the thickness of the overcoat on photodetector 33 and the angle theta of incident light. Accordingly, the detected signal would be optimized at an angle of theta equal to 70° and further optimized by adjusting the thickness of the overcoat of photodetector 33 to a thickness of 1,890 Angstroms or $2\pi$ multiples thereof.

TABLE I

| Overcoat Thickness (Å) | Psi Calculation (°) | Amplitude Ratio |
|---|---|---|
| 90.0 | 9.453 | 158.572 |
| 240.0 | 11.858 | 130.864 |
| 390.0 | 15.255 | 112.862 |
| 540.0 | 18.924 | 100.788 |
| 690.0 | 22.594 | 92.218 |
| 840.0 | 26.238 | 86.021 |
| 990.0 | 29.991 | 81.708 |
| 1140.0 | 34.150 | 79.101 |
| 1290.0 | 39.244 | 78.173 |
| 1440.0 | 46.182 | 78.941 |
| 1590.0 | 56.415 | 81.326 |
| 1740.0 | 71.595 | 84.874 |
| 1890.0 | 88.702 | 280.639 |
| 2040.0 | 69.412 | 275.546 |
| 2190.0 | 54.900 | 279.005 |
| 2340.0 | 45.170 | 281.200 |

Figure 9:
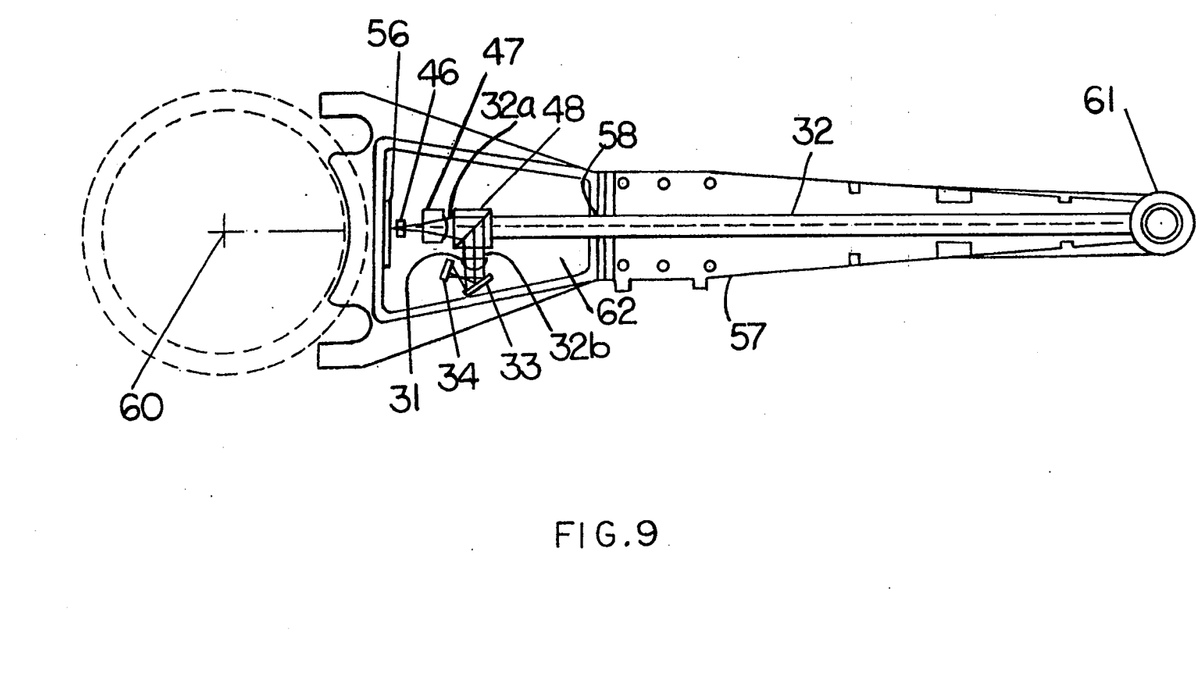
FIG. 9 shows a top perspective view of a rotary actuator arm of one implementation of the present invention.
Figure 10:
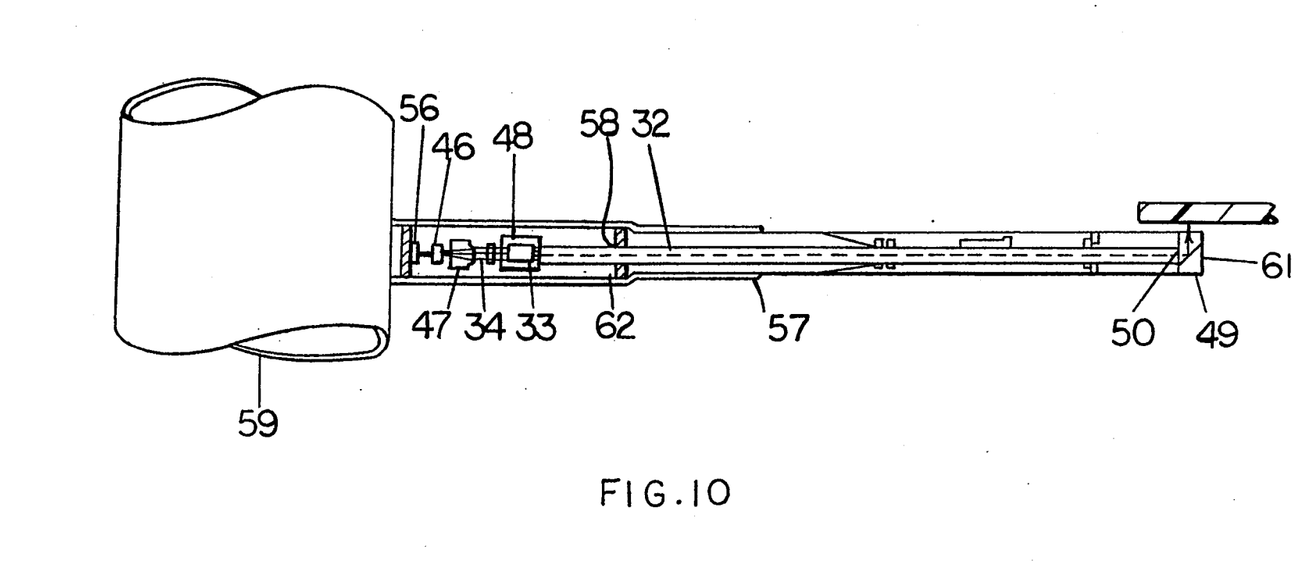
FIG. 10 shows a side cut-away view of the rotary actuator arm as shown in FIG. 9.

By means of further illustration, FIGS. 9 and 10 illustrate one implementation of the present optical differential detection assembly in a magneto-optical storage and retrieval system. Specifically, FIGS. 9 and 10 show a rotary actuator arm 57, which during data recordation and retrieval operations is moved by a rotary actuator 59 arcuately across the storage tracks of a storage disk 51 in a path parallel to the plane of storage disk 51. Rotary actuator arm 57 moves pivotally about axis 60, which is substantially perpendicular to arm 57.

A focus means 61, which includes a fold mirror 49 and an objective lens 50 for focusing the light beam 32 onto the storage disk 51, is located at the end of rotary actuator arm furthest from rotary actuator 59. A source detector module 62 is located adjacent to the rotary actuator 59 and includes a light source 46 for providing light beam 32. Source detector module 62 also includes a collimator lens means 47, a beamsplitter means 48, a window 58, a collecting lens 31, a first photodetector 33, a second photodetector 34, and a third photodetector 56.

During a data record or retrieval operation, the rotary actuator 59 moves the actuator arm 57 in a rotational manner so that the focus means 61 is swept across storage disk 51 in a generally arcuate path parallel to the plane of storage disk 51 until the desired track is located. When the desired track is located, the rotary actuator stops and data is recorded or retrieved as the storage disk 51 is rotated by a spindle motor (not shown). The optics within rotary actuator arm 57, source detector module 62 and focus means 61 perform data recordation, data retrieval, track seek, laser focus and laser power emission detection. As this invention is directed at a novel differential detection system, only the operation of data retrieval will be described fully.

To perform data retrieval, a light source 46, such as a laser diode, emits a light beam 32 from within the source detector module 62 of the rotary actuator arm 57. Light beam 32 is transmitted through a window 58 in the source detector module 62, travels along the arm 57, is bent by fold mirror 49, and is focused on the storage disk 51 by focusing objective 50 within the focus means 61. Light beam 32 is reflected by the storage disk 51 back through the focusing objective 50 and redirected by fold mirror 49 through the window 58 of the source detector module 62. The reflected light beam then enters the beamsplitter 48, which can be any beamsplitter (i.e. a leaky beamsplitter, etc.).

As beam 32 passes through the beamsplitter 48, the light returning from disk 51 is split into two beams, 32a and 32b. The first beam 32a passes through collimating lens 47 and returns to light source 46. Photodetector 56 located behind light source 46 detects the rear-facet emission of light source 46 and determines the power level of the light source 46. The second beam 32b is redirected by beamsplitter 48 toward collecting lens 31, where the beam is collected. After leaving the collecting lens 31, light beam 32b impinges first photodetector 33, which is at a predetermined angle to the incident light beam 32b. As the light beam 32b impinges photodetector 33, the p polarized light is absorbed by the photodetector and the s polarized light is reflected by the surface of the photodetector 33 and redirected toward a second photodetector 34, which is positioned perpendicular to the incident light such that substantially all of the s polarized light is absorbed by the second photodetector.

The p polarized light that is absorbed by photodetector 33 is converted into photocurrent $i_p$ and the s polarized light that is absorbed by photodetector 34 is converted into photocurrent $i_s$. Associated circuitry (not shown) then differences the two photocurrents produced by the two photodetectors 33 and 34 using the equation $i_s - i_p$, thus forming a signal twice as large as the signal from a single detector system.

Photodetectors 33 and 34 can also be segmented in order to generate servo signals, for example a focus error signal and a push/pull tracking error signal, in any known fashion. As will be readily apparent from the above description, information stored in a magneto-optical storage disk can be differentially detected utilizing only detectors; exotic beamsplitters, analyzers, collecting lenses, polarizers, and the like are eliminated by the present invention. Although the storage system described in FIGS. 10 and 11 is shown as a rotary actuated, magneto-optical storage system, the detection optics will work equally well with other types of storage systems including, but not limited to optical storage systems and linear actuated optical and magneto-optical storage systems.

The foregoing description of the invention has been presented for purposes of illustration and description. The embodiment was chosen and described in order to best explain the principles of the invention and its practical application. It is not intended to be exhaustive or to limit the invention to the precise form disclosed, and other modifications and variations may be possible fin light of the above teachings. It is intended that the appended claims be construed to include other alternative embodiments of the invention except insofar as limited by the prior art.

What is claimed is:

1. An optical assembly for detecting a light beam returning from an optical storage media and generating a signal representative of the information contained therein, comprising:
    a first detector means for detecting a first polarization state of said returning light beam, said first detector means being optically coupled to said returning light beam such that said returning light beam impinges a surface of said first detector means at a predetermined angle of incidence, such that light of said first polarization state of said light beam is substantially absorbed by said first detector means and light of a second polarization is substantially reflected by said surface of said first detector means, said first detector means producing a photocurrent having a magnitude proportional to the light absorbed by the first detector means;
    a second detector means for detecting a second polarization state of said light beam, said second polarization state being orthogonal to said first polarization state, said second detector means being optically coupled to said first detector means, wherein said first detector means and said second detector means are not coplanar, wherein light of said second polarization state that is reflected by said surface of said first detector means directly impinges a surface of said second detector means and is substantially absorbed by said second detector means, said second detector means producing a photocurrent having a magnitude proportional to the light absorbed by said second detector means.

2. The optical assembly according to claim 1 wherein said first detector means comprises a first photodetector and said second detector means comprises a second photodetector.

3. The optical assembly according to claim 2 wherein said surface of said first photodetector comprises a transparent dielectric layer.

4. The optical assembly according to claim 3 wherein said transparent dielectric layer has a predetermined thickness, wherein the thickness of the transparent dielectric overcoat layer is adjusted to maximize absorption of the light of said first polarization state by said first detector means and reflection of the light of said second polarization state by said transparent dielectric layer.

5. The optical assembly according to claim 4 wherein said transparent dielectric layer comprises a material having a refractive index of between 1.1 and 3.0.

6. The optical assembly according to claim 2 wherein said first and second photodetectors are silicon photodetectors.

7. The optical assembly according to claim 6 wherein said transparent dielectric layer comprises silica.

8. The optical assembly according to claim 4 wherein said transparent dielectric layer is approximately 1890.0 Angstroms thick or any $2\pi$ multiple of 1890.0 Angstroms.

9. The optical assembly according to claim 2 further comprising a lens means for collecting said returning light beam, said lens means being optically coupled to said first detector means such that said returning light beam passes through said lens means before impinging said first photodetector.

10. The optical assembly according to claim 2 wherein said surface of said first photodetector is positioned at an angle of incidence to the returning light path of approximately 70°.

11. The optical assembly according to claim 10 wherein said surface of said second photodetector is positioned perpendicular to the path of incident light.

12. The optical assembly according to claim 1 further comprising means for differencing the photocurrent produced by the first detector means from the photocurrent produced by the second detector means and producing a resulting signal representative of the information stored on said storage media.

13. The optical assembly according to claim 1 wherein said first detector means and said second detector means further comprising means for generating servo signals.

14. A method for retrieving information from a magneto-optical storage media comprising the steps of:
    (a) directing a beam of light onto said storage media on which bits of information are stored in tracks, said beam of light being reflected by said storage media, said reflected beam of light having a plane of polarization that is rotated as a function of the information stored in the bit;
    (b) directing said reflected beam of light onto a surface of a first photodetector at a predetermined angle of incidence, said surface of said first photodetector comprising a transparent dielectric that allows p polarized light to be absorbed by the first photodetector and reflects s polarized light;
    (c) producing with said first photodetector a first photocurrent having a magnitude proportional to the p polarized light absorbed by said first photodetector;
    (d) directing said reflected s polarized light onto a surface of a second photodetector, said surface of said second photodetector comprising a transparent anti-reflection layer and being substantially perpendicular to the path of the s polarized light, such that substantially all of the s polarized light is absorbed by said second photodetector, wherein said first photodetector and said second photodetector are not coplanar;
    (e) producing with said second photodetector a second photocurrent having a magnitude proportional to the s polarized light absorbed by said second photodetector; and
    (f) differencing said first photocurrent from said second photocurrent to produce a resulting signal representative of said bit of information stored on said storage media.

15. A method for differentially detecting data stored on a magneto-optical media, wherein a beam of light is focused onto said media at desired points, comprising the steps of:
    (a) receiving light reflected from said media at said desired points, wherein said light includes polarized components contained in first and second planes; and
    (b) detecting data represented by said reflected light, said detection comprising the steps of receiving light of a first polarized state and reflecting light of a second polarized state from said reflected light with a first detector means and converting the received light of said first polarized state into a first electronic signal and directly receiving the light of said second polarized state reflected by said first detector means with a second detector means and converting said light of said second polarized state into a second electronic signal, wherein said first detector means and said second detector means are not coplanar, wherein said first detector means is positioned at an approximately 70 degree angle of incidence to the light reflected from said media, wherein said second detector means is positioned approximately perpendicular to the path of the light reflected from said first detector means.

16. The method of claim 15, further comprising the steps of forming an overcoat layer on said first detector means, said overcoat layer effecting the ability of said first detector means to convert said polarized light components so that said first detector means tends to convert more polarized components in said first plane than in said second plane.

17. The method of claim 16, wherein the step of forming said overcoat layer is achieved so that the thickness of said overcoat layer maximizes the intensity of the polarized components in said first plane in relation to the intensity of said polarized components in said second plane.

18. The method of claim 17, wherein said first detector means is a silicon photodetector and said overcoat layer is formed from silica.

19. The method of claim 18, wherein the thickness of said overcoat layer is 1890.0 Angstroms.

* * * * *